(12) United States Patent
Nakazato

(10) Patent No.: US 6,932,705 B2
(45) Date of Patent: Aug. 23, 2005

(54) VIDEO GAME WITH SUB-DISPLAY FOR TRACKING TARGET

(75) Inventor: Takayoshi Nakazato, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 222 days.

(21) Appl. No.: 09/973,036

(22) Filed: Oct. 10, 2001

(65) Prior Publication Data

US 2002/0142835 A1 Oct. 3, 2002

(30) Foreign Application Priority Data

Mar. 29, 2001 (JP) ........................................ 2001-096722

(51) Int. Cl.⁷ ............................................. A63F 13/00
(52) U.S. Cl. ........................................................ 463/31
(58) Field of Search ........................ 463/30–33, 40–44, 463/1–8; 434/69, 29, 61, 62

(56) References Cited

U.S. PATENT DOCUMENTS

| | | | | |
|---|---|---|---|---|
| 5,269,687 A | * | 12/1993 | Mott et al. ..................... | 434/69 |
| 5,354,202 A | * | 10/1994 | Moncrief et al. ............. | 434/69 |
| 5,588,914 A | * | 12/1996 | Adamczyk .................... | 463/32 |
| 5,704,837 A | * | 1/1998 | Iwasaki et al. ................ | 463/38 |
| 6,117,007 A | * | 9/2000 | Matsuyama et al. ........... | 463/6 |
| 6,200,138 B1 | * | 3/2001 | Ando et al. .................... | 434/61 |
| 6,267,674 B1 | * | 7/2001 | Kondo et al. .................. | 463/32 |
| 6,398,647 B1 | * | 6/2002 | Hirai et al. .................... | 463/31 |
| 6,409,596 B1 | * | 6/2002 | Hayashida et al. ............ | 463/31 |
| 6,431,982 B2 | * | 8/2002 | Kobayashi ..................... | 463/4 |
| 6,500,069 B1 | * | 12/2002 | Ohba et al. .................... | 463/31 |
| 6,540,612 B1 | * | 4/2003 | Miyamoto et al. ............ | 463/31 |
| 6,652,376 B1 | * | 11/2003 | Yoshida et al. ................ | 463/6 |
| 2002/0137557 A1 | * | 9/2002 | Ishii et al. ...................... | 463/8 |

FOREIGN PATENT DOCUMENTS

| | | | | |
|---|---|---|---|---|
| JP | 07008632 | * | 1/1995 | |
| JP | 07-008632 | * | 1/1995 | ........... A63F/15/00 |

OTHER PUBLICATIONS

Electronic Arts, Shock Wave video game instruction manual, date unknown.*
Id Software Inc., Final DOOM video game instruction manual, circa 1993–1994.*
Sierra Entertainment, Lords of the Realm II, Oct. 31, 1996, http://www.gamespot.com/pc/strategy/lordsoftherealm2/index.html.*
English Language Abstract for JP Appln. No. 07–008632, together with an English Language Translation of paragraphs [0102–0104].*

* cited by examiner

*Primary Examiner*—Michael O'Neill
(74) *Attorney, Agent, or Firm*—Greenblum & Bernstein, P.L.C.

(57) ABSTRACT

A video game including a player's character that can move in a currently executed game stage. When the target position to be next reached by a player's character does not exist within a radar screen display area in the game field, a flashing target position mark is displayed in the vicinity of the intersection of a segment connecting the player's character position, the target position and the end portion of the radar screen. Thus, the direction toward the target position viewing from the player's character position can be recognized by the target position mark.

15 Claims, 7 Drawing Sheets

70: GAME FIELD AREA
74: TARGET POSITION
72: RADAR SCREEN DISPLAY AREA
71: GAME SCREEN

VIDEO GAME WITH SUB-DISPLAY FOR TRACKING TARGET

BACKGROUND OF THE INVENTION

1. Field of the Invention

The present invention relates to a game apparatus for advancing a game in accordance with a game program, a game control method, a recording medium and a computer program therefor.

2. Description of the Related Art

Recently, role playing games (RPG) are known as one of the categories of video games. In an RPG, a character manipulated by a player, player's character, may grow up meeting with and separating from fellow characters, fighting with an enemy character, and so on.

Further, an RPG may allow the player to collect different kinds of information within a virtual world provided by the game through the player's character and execute different kinds of events in accordance with the collected information. Thus, the player's character in an RPG may solve a mystery and/or a secret in the virtual world, through which the player's character can also grow. In general, an RPG refers to a game having elements that allow a player's character to grow and, further, to do so as part of a story.

Typically, in an RPG, as the game advances, the game stage changes. A game field defined in the virtual world also changes in accordance with a manipulation of the player's character. A final target of the player's character, determined as the game advances in a given game stage, also may change one after the other. In an RPG, the player may additionally manipulate the player's character in order to undergo different kinds of experiences before the final target.

Typical to an RPG is also a display screen on a display apparatus that the player can actually view within a view of the player's character. This display, however, is only a part of a given game field. Thus, in order to check where a final target exists within the game field, some games include a function to display a so-called radar screen for checking in a wider game field.

Displaying the radar screen so as to display a whole area of the game field, for example, allows the display of a final target within the radar screen for checking. However, in order to achieve this, the reduction rate of the screen must be reduced. Thus, a condition around the player's character can be hard to recognize.

Therefore, the size of an area displayed on a radar screen within a given game field must be reduced so as to allow both manipulation on the player's character and recognition of the condition around the player's character at the same time.

Conventionally, a game is advanced by checking a condition around player's character on a radar screen, and in order to check a final target, a displayed area is expanded toward the radar screen. After checking the target, the displayed area of the radar screen is changed to the size that the surrounding of the player's character can be recognized for performing game operations.

Thus, manipulations are complicated, and player's character may move toward the direction completely different from a final target when checking of the target is neglected, which may disturb the progress of the game.

SUMMARY OF THE INVENTION

It is an object of the present invention to provide a game apparatus and a game control method which allows both checking of a condition around a player's character and accurate movement of the player's character toward a final target at the same time.

According to an aspect of the present invention, there is provided a game apparatus, which can execute a game in accordance with a game program, including a display control unit for displaying within a game field a position of player's character moving in the game field and a predetermined area around the player's character. Also included is a recognition unit for recognizing a target position of the player's character, which is fixed in the game field with the advance of the game, and a position of the player's character within the game field. When the target position of the player's character cannot be displayed on a display screen of a display apparatus, the display control unit displays an indicator for indicating a direction toward the target position in the vicinity of an end portion of the display screen in the target position direction viewing from the player's character in accordance with a recognition result by the recognition unit.

For example, the indicator may have periodically changing brightness.

The display control unit may also display, at least in a part of a game screen, the position of the player's character within the game field and a predetermined area around the player's character.

According to another aspect of the present invention, there is provided a computer program executable in a game apparatus, which can execute a game in accordance with a game program, including a display control program array for displaying within a game field a position of a player's character moving in the game field and a predetermined area around the player's character, and a recognition program array for recognizing a target position of the player's character, which is fixed in the game field with the advance of the game, and a position of the player's character within the game field. When the target position of the player's character cannot be displayed on a display screen of a display apparatus, the display control program array displays an indicator for indicating a direction toward the target position in the vicinity of an end portion of the display screen in the target position direction viewing from the player's character in accordance with a recognition result by the recognition program array.

According to another aspect of the present invention, there is provided a computer readable recording medium, which can be read by a game apparatus for executing a game in accordance with a computer program, including a display control program array for displaying within a game field a position of player's character moving in the game field and a predetermined area around the player's character, and a recognition program array for recognizing a target position of the player's character, which is fixed in the game field with the advance of the game, and a position of the player's character within the game field. When the target position of the player's character cannot be displayed on a display screen of the display apparatus, the display control program array displays an indicator for indicating a direction toward the target position in the vicinity of an end portion of the display screen in the target position direction viewing from the player's character in accordance with a recognition result by the recognition program array.

According to the present invention, the direction that the player's character should go can be surely realized. The radar screen display area is displayed with the magnification which allows easy manipulation of player's character.

Further, surroundings of the player's character can be realized, and, at the same time, the player's character can be moved toward a final target accurately.

Accordingly, a game can advance without the reduction of interest in the advance of the game.

DESCRIPTION OF THE PREFERRED EMBODIMENTS

One embodiment of the present invention is described below. An example of the present invention is applied to a game apparatus by using an RPG as a specific game example. However, the present invention is applicable to any game which may be executed between game machines in real time, such as an action game and a table game.

Figure 1:
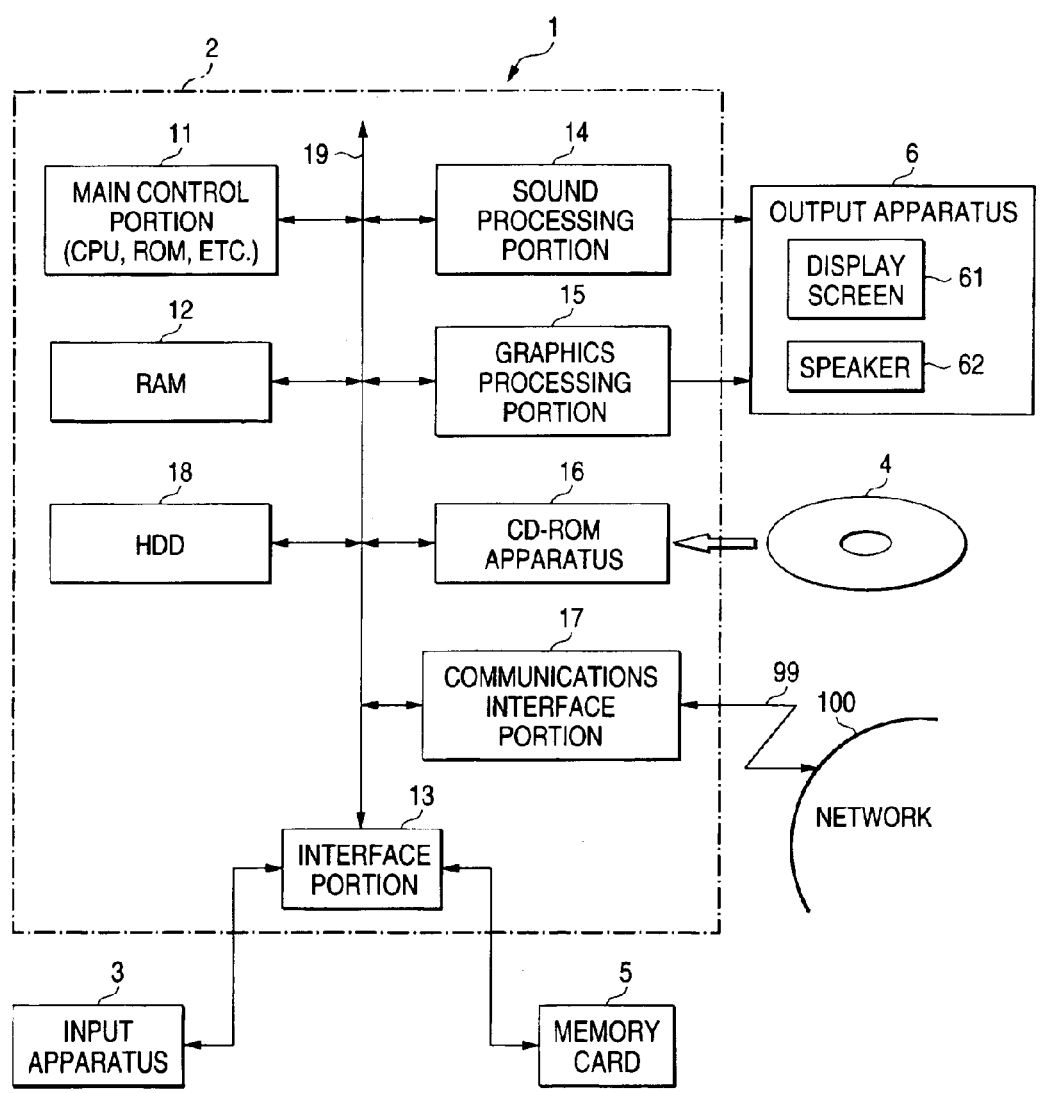
FIG. 1 is a block diagram showing an exemplary constitution according to one embodiment of the present invention.

FIG. 1 is a block diagram showing an exemplary constitution of a game system according to one embodiment of the present invention. A game apparatus 1 mainly includes a game apparatus body 2 having main functions of the game apparatus 1 and an input apparatus 3 (including a keypad and controller, for example) for inputting manipulation instructions to the game apparatus body 2.

Further, a memory card 5 for storing game data such as game-in-progress data and game environment setting data may be attached removably to the game apparatus body 2. Furthermore, an output apparatus 6 (including a monitor display and a speaker, for example) for performing video display, sound output, and so on in accordance with game contents based on video and/or audio signals from the game apparatus body 2 is connected to the game apparatus body 2 for game execution.

Still further, a compact disk read only memory (CD-ROM) 4 for storing a program for implementing processing relating to a game described below and/or image data, sound data, and so on is mounted to the game apparatus body 2.

The game apparatus body 2 includes a main control portion 11 having a central processing unit (CPU) and/or a read only memory (ROM) built-in, a random access memory (RAM) 12, an interface portion 13, a sound processing portion 14, a graphics processing portion 15, a CD-ROM drive 16 for accessing contents on the removable CD-ROM 4 mounted therein, a communication interface 17 for performing data communication and the like with another game machine over a communication medium (network) 100, a hard disk drive (HDD) 18, and a bus 19 for connecting the above-described components to each other.

The main control portion 11 further includes an oscillator and a timer counter (both of which are not shown), and creates a clock signal based on a timing signal output from the oscillator for every predetermined period. Then, the main control portion 11 counts the clock signal by using the timer counter so as to measure time.

The RAM 12 is a main memory apparatus used when a CPU in the main control portion 11 executes a given program. Programs executed by the CPU and data required for the execution of the programs are stored therein. Further, the RAM 12 is used as a working area for program execution.

The interface portion 13 is arranged to accept the removable input apparatus 3 and the removable memory card 5. The interface portion 13 controls data transfer between each portion (mainly, main control portion 11) connected to the bus 19 and the input apparatus 3 or the memory card 5.

The sound processing portion 14 is a circuit for performing processing for reconstructing audio data such as background music (BGM) and/or sound effects of a game. The sound processing portion 14 creates audio signals based on data stored in the RAM 12 in accordance with an instruction from the main control portion 11 and supplies them to the output apparatus 6.

The graphics processing portion 15 includes a frame buffer (not shown) and renders an image on the frame buffer in accordance with an instruction from the main control portion 11. Further, the graphics processing portion 15 creates video signals by adding a predetermined simultaneous signal to image data rendered on the frame buffer and supplies them to the output apparatus 6.

The CD-ROM drive 16 is a reading apparatus for reading data stored on the CD-ROM 4, which is a recording medium. The game apparatus 1 causes the game apparatus body 2 to execute control over the game described later in accordance with a game program recorded on the CD-ROM 4.

The communication interface 17 transfers data to and controls communications with another communication enabling apparatus, such as another game apparatus, connected to the network 100. For example, the communication interface 17 controls exchanges of information (programs and/or data) between the game apparatus body 2 and the communication network 100. A game program and data are downloaded from the communication network 100 through the communication interface 17 and the communication circuit 99 and can be stored in the HDD 18.

The HDD 18 is an auxiliary memory apparatus used when the CPU of the main control portion 11 executes a given program. Various data and programs may be stored in the HDD 18, such as information downloaded by using the communication interface 17 and information read from the CD-ROM 4.

Programs, image data, sound data, and so on are stored in the CD-ROM 4 for implementing processing regarding a given game, as described above. Programs causing the game apparatus 1 to execute a method according to this embodiment are included in the game programs. Game software stored in the CD-ROM 4 activates and causes the CD-ROM drive 16 to read necessary game programs and game data.

Further, the game software operates the main control portion 11 in accordance with the read programs.

The game software is pre-installed in the HDD 18. In accordance with an instruction from the main control portion 11, audio signals are created based on data stored in the RAM 12 and then supplied to the output apparatus 6. Notably, the game apparatus 1 can store game software in the HDD 18.

The graphics processing portion 15 includes a frame buffer (not shown) and renders a game image on the frame buffer in accordance with control by the main control portion 11. Further, the graphics processing portion 15 creates video signals by adding a predetermined simultaneous signal to image data having been rendered in the frame buffer and supplies them to the output apparatus 6.

The input apparatus 3 includes a controller to be manipulated by the player in order to input various instructions to the game apparatus body 2 regarding a given game. The input apparatus 3 sends an instruction signal corresponding to player's manipulation to the game apparatus body 2 through the interface portion 13.

Figure 2A:
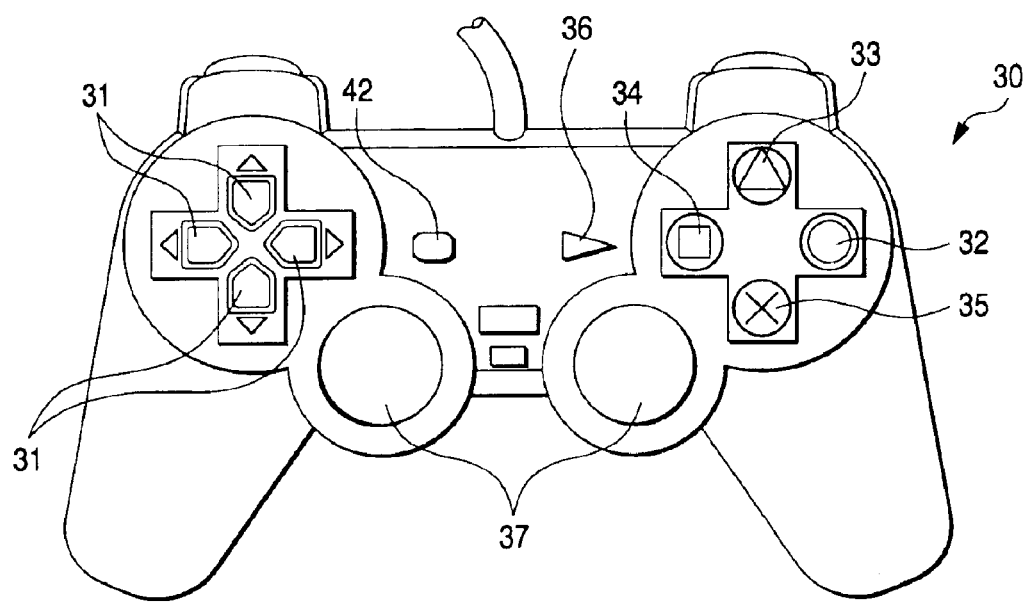
FIGS. 2A and 2B are diagrams for describing one example of an input apparatus according to the embodiment.
Figure 2B:
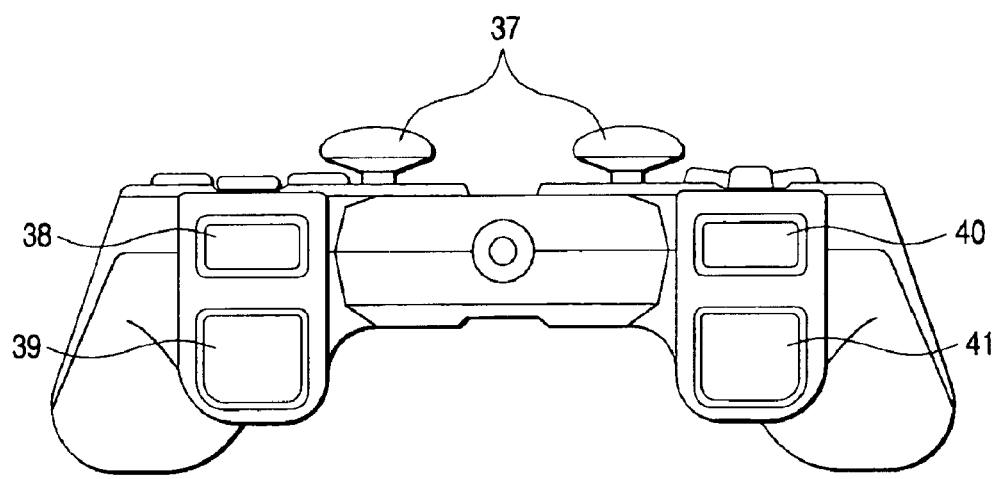

In this embodiment, instructions for advancing a given game are input by a controller. An example where a controller 30 is used for inputting instructions as the input apparatus 3 is now described. A constitutional example of the controller 30 used as the input apparatus 3 in this embodiment will be shown in FIGS. 2A and 2B. FIGS. 2A and 2B are diagrams for describing an example of the input apparatus according to this embodiment. FIGS. 2A and 2B show a plan view and a back view thereof, respectively.

In FIG. 2A, the controller 30 includes a cross key 31 for inputting movement information and so on, and manipulation keys (for example, a ○ button 32, a Δ button 33, a □ button 34, a × button 35, a start button 36, and a select button 42) for inputting different kinds of instructions to the game apparatus body 2.

Further, the controller 30 includes a joystick 37 for inputting movement information. As shown in FIG. 2B, each of multiple manipulation keys (an R1 button 38, an R2 button 39, an L1 button 40, and an L2 button 41) is provided at the back of the controller 30.

The keys, except for the start button 36 and the select button 42, are arranged to be pressure-sensitive. Further, the controller 30 has a vibration function with a motor built-in. The motor operates in response to a predetermined control signal from the game apparatus body 2 so as to vibrate the controller 30 entirely. Thus, vibration is transmitted to a player who holds the controller 30.

The game apparatus body 2 can adjust the strength of vibration including three types of "strong", "medium" and "weak". The vibration of the controller 30 is intermittent and can be controlled such that vibration with either one type of strength is created randomly.

The memory card 5 includes a flash memory and is an auxiliary memory apparatus for storing game data under control of the game apparatus body 2. Writing data in the memory card 5 and reading data from the memory card 5 are controlled by the main control portion 11 through the interface portion 13.

The output apparatus 6 displays game images and outputs voices based on video signals and audio signals from the game apparatus body 2. Further in this embodiment, a monitor apparatus, such as a television (TV) set having a speaker built-in, is provided as the output apparatus 6. The monitor apparatus includes a display screen 61 for displaying images and a speaker 62 for outputting voices.

Further, the output apparatus 6 displays an image on the display screen 61 in response to video signals from the graphics processing portion 15 and outputs voice from the speaker 62 in response to sound signals from the sound processing portion 14. Therefore, the output apparatus 6 functions as both display apparatus and voice output apparatus.

The main control portion 11 controls operations of the game apparatus body 2 based on basic software stored in the ROM or game software which has been read from the CD-ROM 4 by the CD-ROM drive 16 and stored in the RAM 12.

For example, the CPU reads graphic data from the CD-ROM 4 and transfers it to the graphics processing portion 15. Then, the CPU instructs the graphics processing portion 15 to create an image. In response to the instruction, the graphics processing portion 15 creates video signals by using the graphic data. The video signals are sent to the output apparatus 6. Thus, an image is displayed on the display screen of the output apparatus 6.

The game apparatus, according to this embodiment having the above-described constitution, is arranged to be able to communicate with another game apparatus through the network 100, which enables a networked game by which multiple players can participate in one game over the network 100. In this case, the game program can be not only read from the CD-ROM 4 but also downloaded from another communication equipment (server equipment) connected to the network 100.

Figure 3:
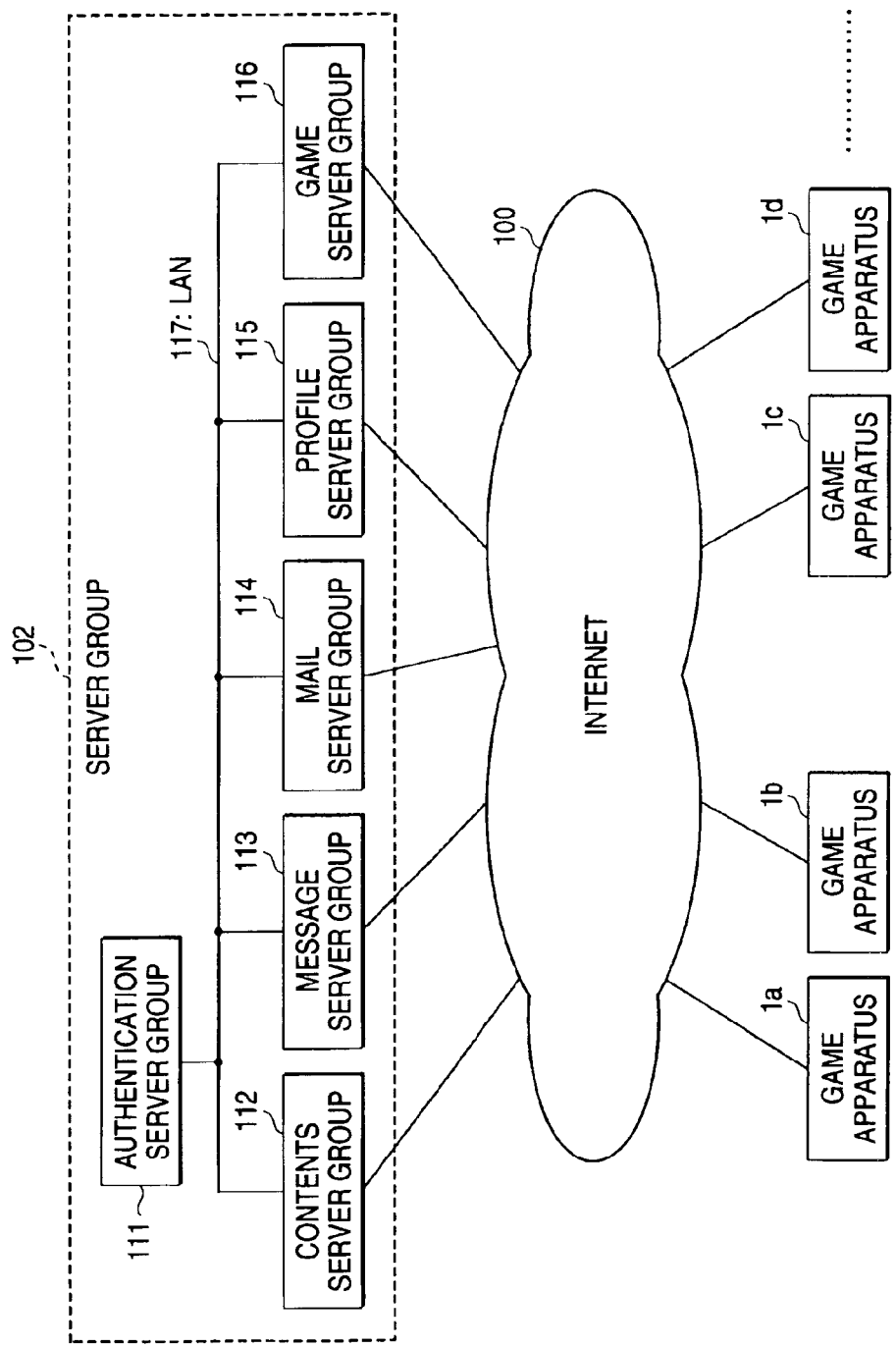
FIG. 3 is a schematic diagram showing an exemplary constitution of a networked game system for providing network-enabled game services according to the embodiment.

A constitution of a networked game system for a case where a networked game is executed by using above-described functions is described below with reference to FIG. 3. FIG. 3 is a schematic diagram showing a constitution of the networked game system for providing networked game services according to this embodiment.

In the networked game system according to this embodiment, game apparatuses 1a, 1b, 1c and 1d, which have the constitution shown in FIG. 1, are connected to a network system through a communication medium, such as a server group 102 over the Internet 100. Notably, the number of connected game apparatuses is not limited to the number in the example shown in FIG. 3. Further, the number of connected game apparatuses is not limited regardless of game contents, and any number more than one of game apparatuses can be connected for game execution.

The server group 102 includes an authentication server group 111 for performing account management for user authentication, for example, a contents server group 112 for providing an interface between the game apparatus 1 and another server group and for providing services for viewing contents such as voices and animation, a message server group 113 for providing chat and/or messenger environment, a mail server group 114 for providing e-mail services, a profile server group 115 for managing user profiles, and game server group 116 for providing game environment.

Server groups 111 to 116 are connected to each other through a LAN 117. The constitution of the server groups is not limited to the above-described example. All of the server group functionality may be implemented in one server, or may be divided.

The game server group 116 includes a lobby server for executing a given game according to this embodiment. When the game apparatus 1 is connected to the lobby server, a screen showing a virtual "lobby" is displayed on the display apparatus 6. In this lobby screen, the player's character and characters of other players connecting to the lobby server are displayed. Players can participate in chat so that they can communicate with other players or can look for a partner to play the game together.

According to this embodiment, in addition to a chat message for displaying text information input by the player in realtime, a message selected by the player from predetermined candidates can be displayed continuously in the vicinity of the player's character.

Next, game programs and data, which have been read by the CPU of the main control portion 11 from the CD-ROM 4 and then stored in the main memory, that is RAM 12, will be described.

Figure 4:
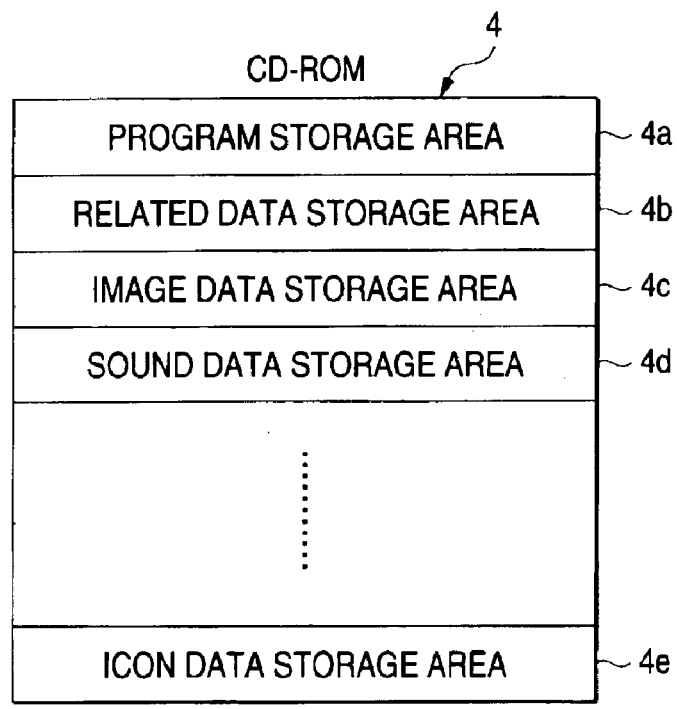
FIG. 4 is a diagram for describing an exemplary detail constitution of a CD-ROM according to the embodiment.

FIG. 4 shows a diagram for describing stored contents and storage areas in the CD-ROM 4.

As shown in FIG. 4, the CD-ROM 4 includes a program storage area 4a for storing a game program to be executed by the main control portion 11, a related data storage area 4b for storing data required for advancing different kinds of games, an image data storage area 4c for storing, for example, modeling data in three-dimensional model and two-dimensional image data used as a background, a sound data storage area 4d for storing sound data such as sound effects, icon data storage area 4e for storing icon information unique to the game, such as characters appeared in the game, and so on.

In this embodiment, some of data required for advancing the game in a certain stage among different kinds of data stored in respective storage areas in the CD-ROM 4 are loaded to the RAM 12. The game advances based on the data loaded to the RAM 12.

If data is required for advancing the game, the next data required for advancing the game is loaded to the RAM 12 among different types of data stored in respective storage areas in the CD-ROM 4.

If a networked game is executed, the advance of the game is under the control of the lobby server for executing a game in the game server group 116 in the server group 102. Some data, which are stored in respective storage areas in the CD-ROM 4 and are required for the advance of the game, are loaded to the RAM 12 in accordance with the advance control by the lobby server. The game advances based on the data loaded to the RAM 12.

Next, programs and data to be read by the main control portion 11 from the CD-ROM 4 and then be stored in the RAM 12 are described.

Figure 5:
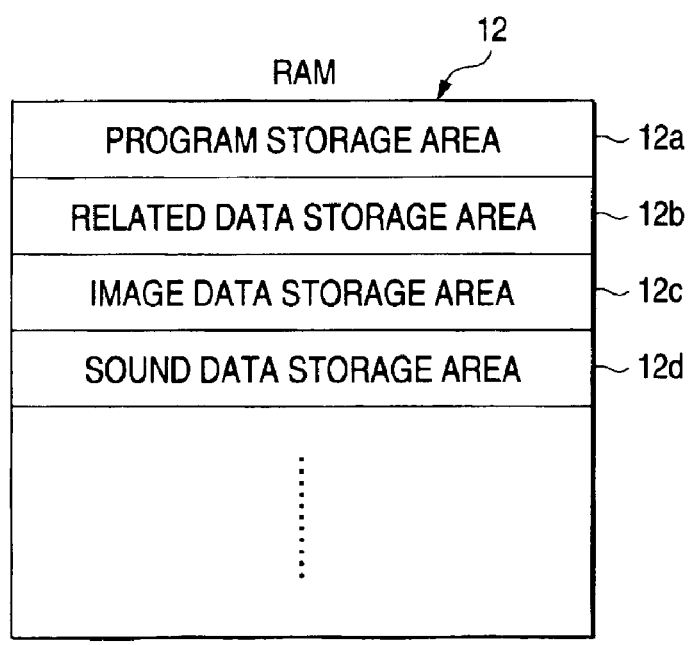
FIG. 5 is a diagram showing an exemplary memory constitution of a main memory shown in FIG. 2 according to the embodiment.

FIG. 5 is a diagram showing an exemplary memory constitution of the RAM 12 according to this embodiment. As shown in FIG. 5, the RAM 12 has a program storage area 12a for storing programs to be executed by the main control portion 11, a related data storage area 12b for storing data required for execution of different kinds of processing, an image data storage area 12c for storing modeling data for a three-dimensional model, image data relating to two-dimensional image data used as a background, for example, and so on, and sound data storage area 12d for storing sound data such as sound effects.

In this embodiment, except for a case where a game is started newly, game data having read from the memory card 5 is read to the related data storage area 12b at the beginning, and the game is re-started in accordance with the read game data.

In this embodiment, game data is updated in the related data storage area 12b of the RAM 12 as the game advances. Then, if game data is instructed to save during the game, game data (game-in-progress information) stored in the related data storage area 12b is read and then is written in a specified game-data storage area in the memory card 5.

When the game apparatus 1 is powered off, the game data is maintained as it was saved in the memory card 5. Therefore, when the game apparatus 1 is powered on and the game is re-started, the saved data is read from the memory card 5 and stored in the related data storage area 12b. Thus, the game apparatus 1 is controlled to allow re-starting the game from the game scene having been saved.

Figure 6:
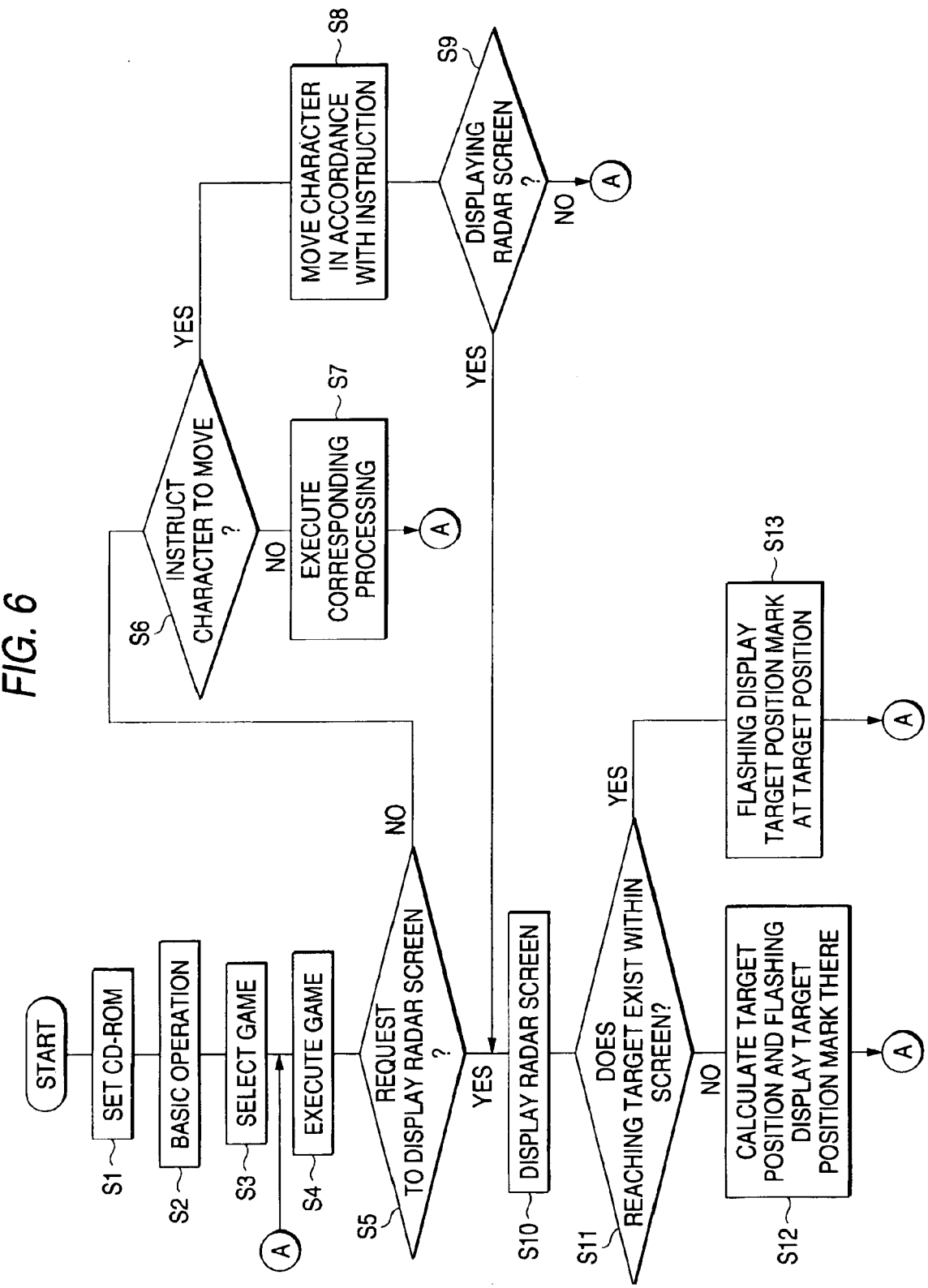
FIG. 6 is a flowchart for describing an exemplary RPG execution control according to the embodiment.

Control over an RPG according to this embodiment including the above-described constitution is described with reference to a flowchart shown in FIG. 6. FIG. 6 is a flowchart for describing control over an RPG according to this embodiment. The game apparatus body 2 executes a game program stored in the CD-ROM 4 in order to implement the processing.

In step S1 in FIG. 6, the CD-ROM 4 on which a game program is recorded is set in the game apparatus body 2. This leads the processing to step S2, where a necessary program is read from the CD-ROM 4 and stored in the RAM 12. Then, an initial screen (such as manufacturer's logo) is displayed, the memory card 5 is checked, and a title screen is displayed. Then, basic processing including data loading is performed.

In step S3, a game selection screen is displayed, and game data to be executed is selected there from game saved data relating to a given game read from the memory card 5 at the end of the basic processing. Then, the processing goes to step S4.

In step S4, the selected game data is read from a corresponding game data file thereof and stored in the related data storage area 4b of the RAM 12. The game is started from the state having been saved. Notably, when there is no data having saved, that is, when a player would play a game from the first stage, a new game is started automatically.

Further, when the game is a networked game and when a partner is a player manipulating another game apparatus over the network 100, the player interacts with the partner player by playing the game.

When the controller 30 is manipulated or a field is changed in accordance with the advance of the game, the processing goes to step S5. In step S5, it is checked whether or not the display of a radar screen is requested. If so, the processing goes to step S10.

On the other hand, if the display of a radar screen is not requested in step S5, the processing goes to step S6, where it is checked whether or not the movement of a game character is instructed by manipulating the controller 30. If not, the processing goes to step S7, where game advance processing required for a given game scene is performed. Then, the processing returns to step S4. For example, in a fighting scene, the game advances in a fighting mode.

On the other hand, if the movement of a game character is instructed by manipulating the controller 30 in step S6, the processing goes to step S8, where the game character is moved within a given game field in accordance with the instruction through the manipulation on the controller 30. Then, the processing goes to step S9, where it is checked whether or not a radar screen is being displayed. If not, the processing goes to step S4.

On the other hand, if a radar screen is being displayed in step S9, the processing goes to step S10.

In step S10, the radar screen is displayed with the magnification defined with respect to a current position of player's character. More specifically, a mark indicating the current position of the player's character is placed in the vicinity of substantially the center of the radar screen in order to display geographical features and a condition around player's character within the game field.

Next, in step S11, it is checked whether or not a target point to be reached by the player's character, which is fixed depending on the advance of the game, is positioned within the displayed radar screen. If not, the processing goes to step S12, where a direction of the final target position with respect to the player's character at the end of the radar screen is calculated. Then, a target position mark is flashing-displayed in the vicinity of an intersection of the end portion of the radar screen and the direction of the target position. Then, the processing goes to step S4.

Specifically, the intersection of a segment connecting a mark indicating player's character on the radar screen and a final target position within the game field and the radar screen end portion is calculated, and a target mark is displayed in the vicinity of the intersection. An example of a displayed game screen according to this embodiment is shown in FIG. 7, in which a radar screen displaying the target position mark is displayed in the vicinity of the radar screen end portion.

Figure 7:
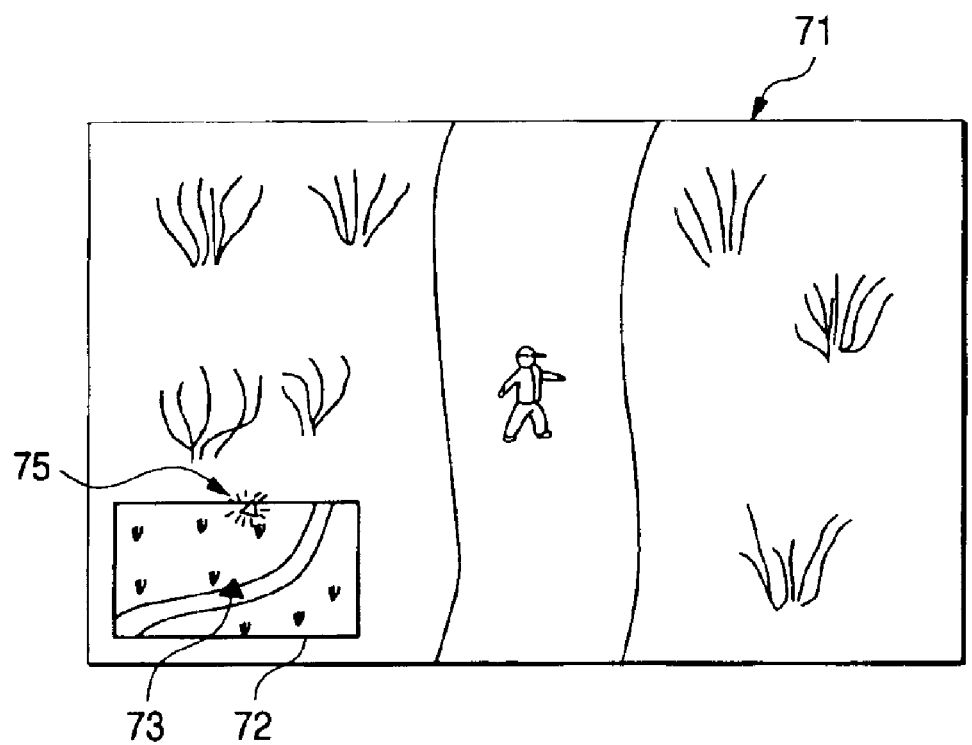
FIG. 7 is a diagram showing an example of display of a game screen on which a radar screen displaying a target position mark is displayed according to the embodiment.

FIG. 7 includes an illustrative game screen 71 displayed on the display screen 61 and an illustrative radar screen 72 displayed at a part of the game screen 71. The radar screen 72 includes a mark 73 for indicating a position of player's character and a target position mark 75 for indicating a direction towards a target to be reached by the player's character.

Figure 8:
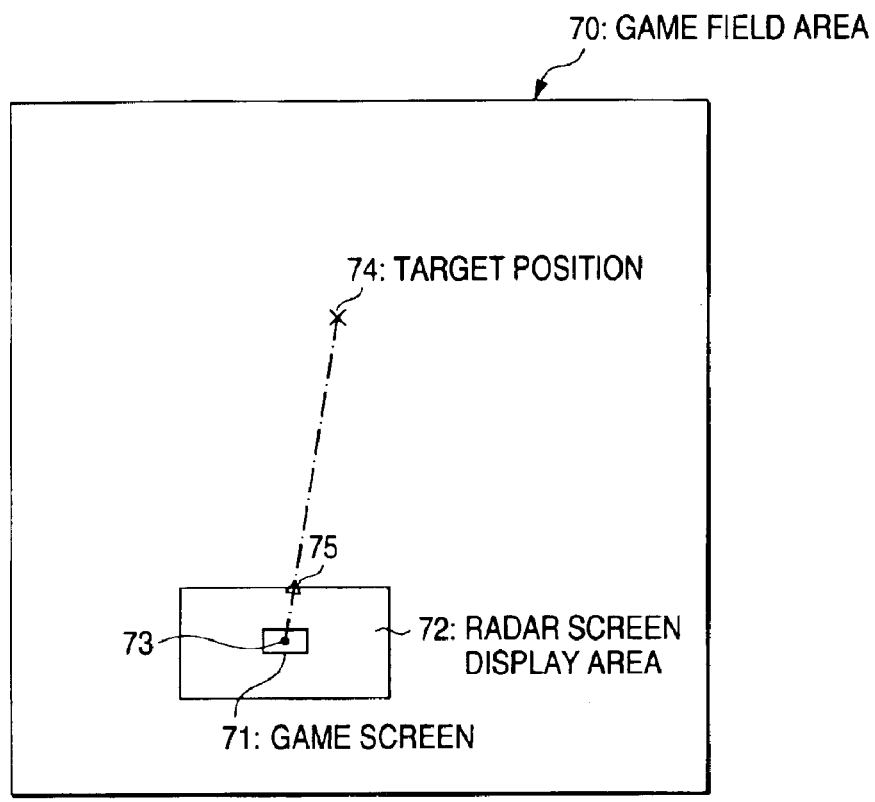
FIG. 8 is a diagram for describing an exemplary principle of a radar screen display according to the embodiment.

A principle for the display of the radar screen 72 is described with reference to FIG. 8. FIG. 8 is a diagram for describing a principle of the display of a radar screen according to this embodiment.

FIG. 8 includes a whole area of a game field 70 where player's character can move in a currently executed game stage, a displayed area 71 in a radar screen displayed at a part of the display screen 61, and a displayed area 72 of a game screen displayed on the display screen 61.

Further, FIG. 8 includes a player's character position 73 in the game field 70 and a target position 74 to be reached by player's character next in the game field 70.

Under this condition, a target position mark 75 is flashing-displayed in the vicinity of the intersection of a segment connecting the player's character position 73 and the target position 74 and the end portion of the radar screen 72 such that the direction toward the target position viewing from the player's character position can be recognized by the target position mark.

As a result, the direction that player's character should go can be realized easily without setting the radar screen displaying a wider area including a target position. Therefore, the radar screen can display such that the player's character can realize his/her surrounding geographical features best as he/she goes forward. Thus, the operability of games can be increased significantly.

The player can cause the player's character to go to the direction toward the target position easily only by checking the radar screen shown in FIG. 7, for example, and by moving the player's character toward the direction of the target position mark. As the player's character moves, the game screen displayed area 72 also moves by the same distance as that the player's character has moved under the display control over the game screen, which is display-controlled in step S8.

Then, the radar screen displayed area 71 in step S10 also moves by the distance that player's character has moved, which moves the target position mark. Thus, the player's character is manipulated to approach the target position step by step so that the target position enters into the radar screen. Then, in step S11, the target position is within the radar screen. In this case, the processing advances from S11 to S13, and the target position mark 75 is flashing-displayed at the target position within the radar screen 72. Then, the processing returns to step S4.

Figure 9:
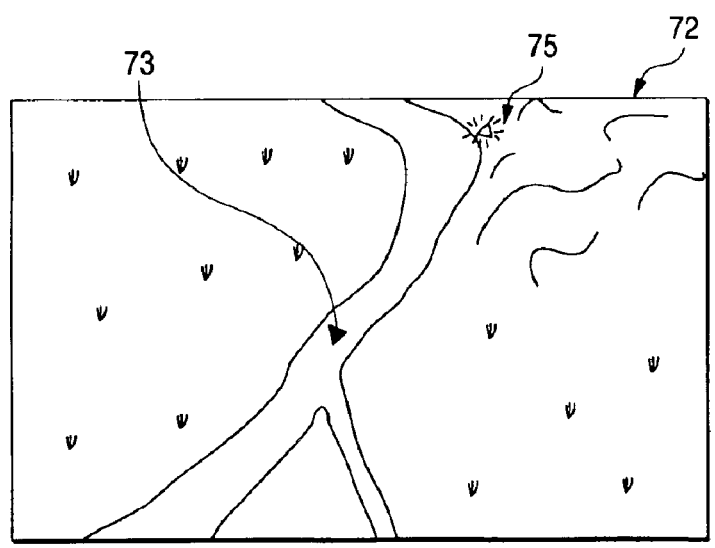
FIG. 9 is a diagram for describing exemplary game progress when a one-touch button is input from the game screen shown in FIG. 7 according to the embodiment.

An example of the displayed radar screen where a target point to be reached by player's character is positioned within the radar screen will be described with reference to FIG. 9. FIG. 9 is a diagram schematically showing an example of the displayed radar screen where a target position mark is displayed within the radar screen according to this embodiment.

When the target enters into the radar screen 72, the form of the target position mark may be changed to a mark in the other form, such as an "!" mark. Thus, the screen can be differentiated from the previous displayed screen.

As described above, according to this embodiment, when the next target position 74 to be reached by the player's character does not exist within the displayed radar screen area 72 in the game field 70 where the player's character can move in the currently executed game stage, a target position mark 75 is displayed flashing in the vicinity of the intersection of a segment connecting the player's character position 73 and the target position 74 and the end portion of the radar screen 72. Thus, the direction toward the target position viewing from the player's character position can be recognized by the target position mark.

Therefore, the direction that the player's character should go can be realized surely since the radar screen displayed area is displayed with the magnification which allows easy manipulation of player's character. Thus, surroundings of player's character can be realized, and, at the same time, the player's character can be moved toward a final target accurately.

While the present invention has been described above specifically based on embodiments and the modification examples, the present invention is not limited to the above-described embodiments and the modification examples and can be changed as necessary without departing from the principle.

For example, in the above-described embodiments and the modification examples, a case where the present invention is implemented by using a home game machine as the platform has been described. However, the present invention may be implemented by using a generic computer such as a personal computer and a street game machine as the platform.

Further, in the above-described embodiments and the modification examples, programs and data for implementing the present invention are stored in a CD-ROM, and the CD-ROM is used as an information recording medium. However, the information recording medium is not limited to a CD-ROM and may be the other computer-readable, magnetic or optical recording medium, such as a magnetic disk and a ROM card, or a semiconductor memory.

Further, programs and data for implementing the present invention are not limited to forms provided through a medium such as a CD-ROM, which can be mounted to a game machine or a computer removably. Saved data for implementing the present invention may be received from the other equipment, such as a server group, connected through a communication circuit, for example, and may be recorded in a memory. Further, the above-described programs and data may be recorded in a memory of the other equipment connected through a communication circuit, for example, and the recorded programs and data may be used through the communication circuit.

What is claimed is:

1. A game apparatus, which can execute a game in accordance with a game program, comprising:

a display controller that displays, in a first display area, a game field and a position of a player's character moving in said game field and, in a second smaller display area, separately displays a larger predetermined area of said game field around said player's character; and a recognizer that recognizes a target position of said player's character, which is fixed in said game field, and a position of said player's character within said game field, wherein said display controller displays an indicator for said target position for said player's character in said larger predetermined area when said target position is in said larger predetermined area of said game field, and when said target position of said player's character cannot be displayed in said larger predetermined area said display controller displays an indicator for indicating a direction to said target position, the indicator being located in a vicinity of an edge of said second display area in accordance with a recognition result by said recognizer.

2. The game apparatus according to claim 1, wherein said indicator has periodically changing brightness.

3. The game apparatus according to claim 1, wherein said display controller displays, at least in a part of a game screen, said position of said player's character within said game field of said first display area and said second display area.

4. A game control method for a game apparatus, which can execute a game in accordance with a game program, comprising:

displaying, in a first display area, a game field and a position of a player's character moving in the game field and, in a second smaller display area, separately displaying a larger predetermined area of the game field around the player's character;

recognizing a target position of the player's character, which is fixed in the game field, and a position of the player's character within the game field; and displaying an indicator for the target position of the player's character in the larger predetermined area when the target position is in the larger predetermined area of the game field, and when the target position of the player's character cannot be displayed in the larger predetermined area displaying an indicator for indicating a direction toward the target position, the indicator being displayed in vicinity of an edge of the second display area in accordance with a recognition result of recognizing the target position.

5. The game control method according to claim 4, further comprising periodically changing the brightness of the indicator.

6. The game control method according to claim 4, wherein the displaying comprises displaying, at least in a part of a game screen, the position of the player's character within game field of the first display area and second display area.

7. A computer readable recording medium, which can be read by a game apparatus for executing a game in accordance with a game program, comprising:

a display control program for displaying, in a first display area, a game field and a position of player's character moving in said game field and, in a second smaller display area, separately displaying a larger predetermined area around said player's character; and a recognition program for recognizing a target position of said player's character, which is fixed in said game field with the advance of said game, and a position of said player's character within said game field, wherein, said display control program displays an indicator for said target position for said player's character in the larger predetermined area when said target position is in said larger predetermined area of said game field, and when said target position of said player's character cannot be displayed in the predetermined area said display control program displays an indicator for indicating a direction toward said target position in the vicinity of an edge of said second display area in accordance with a recognition result by said recognition program.

8. The computer readable recording medium according to claim 7, wherein said indicator displays periodically changing brightness.

9. The computer readable recording medium according to claim 7, wherein said display control program displays, at least in a part of a game screen, said position of said player's character within said game field of the first display area and the second display area.

10. The game apparatus according to claim 1, wherein said display controller further defines a display magnification of the predetermined area around said player's character based on said character's position.

11. The game control method according to claim 4, wherein the displaying further defines a display magnification of the predetermined area around the player's character based on the character's position.

12. The computer readable recording medium according to claim 7, wherein said display control program further defines a magnification of the predetermined area around said player's character based on said character's position.

13. The game apparatus according to claim 1 further comprising:

a determiner that determines whether said target position can be displayed in said second display area.

14. The game control method according to claim 4, further comprising:

determining whether the target position can be displayed in the second display area.

15. The computer readable recording medium according to claim 7 further comprising:

a determination program that determines whether said target position can be displayed in said second display area.

* * * * *

UNITED STATES PATENT AND TRADEMARK OFFICE
CERTIFICATE OF CORRECTION

PATENT NO. : 6,932,705 B2
DATED : August 23, 2005
INVENTOR(S) : T. Nakazato

It is certified that error appears in the above-identified patent and that said Letters Patent is hereby corrected as shown below:

Column 11,
Line 55, before "vicinity" insert -- a --.

Column 12,
Line 1, after "within" insert -- the --.

Signed and Sealed this

Second Day of May, 2006

JON W. DUDAS
*Director of the United States Patent and Trademark Office*